(12) United States Patent
Peritore et al.

(10) Patent No.: US 6,463,211 B1
(45) Date of Patent: Oct. 8, 2002

(54) CALIBRATION TECHNIQUE OF A BEMF DETECTOR

(75) Inventors: Roberto Peritore, Trezzano sul Naviglio; Alberto Salina, Limbiate; Andrea Merello, Arese; Lorenzo Papillo, Milan; Francesco Vavala, Assago; Gianluca Ventura, Cinisello Balsamo, all of (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 15 days.

(21) Appl. No.: 09/693,499

(22) Filed: Oct. 20, 2000

Related U.S. Application Data

(60) Provisional application No. 60/215,808, filed on Jul. 5, 2000.

(51) Int. Cl.[7] .................................................. H02P 5/00
(52) U.S. Cl. .................... 388/928.1; 318/254; 318/138; 318/799
(58) Field of Search ........................ 388/928.1; 318/254, 318/138, 799

(56) References Cited

U.S. PATENT DOCUMENTS

| | | | | |
|---|---|---|---|---|
| 5,654,840 A | * | 8/1997 | Patton et al. ............ | 318/601 X |
| 5,818,179 A | * | 10/1998 | Kokami et al. ............. | 318/254 |
| 6,081,112 A | * | 6/2000 | Carobolante et al. ........ | 324/177 |

* cited by examiner

*Primary Examiner*—Jeffrey Donels
(74) *Attorney, Agent, or Firm*—Lisa K. Jorgenson; Dennis M. de Guzman; Seed IP Law Group

(57) ABSTRACT

The present invention relates to the positioning of the read/write transducer heads of an hard disk (HD) in a designated landing zone when requested or when the electrical power is removed from the drive. In particularly it relates to the detection of the back electromotive force (BEMF) of the motor involved in the positioning of the read/write transducer heads. According to an embodiment of the present invention a BEMF detection circuit for a voice-coil motor operative to continually generate a signal proportionally to the velocity of said voice-coil motor comprises a algebraic summing node producing at its output the BEMF of the voice-coil motor and receiving: a first voltage proportional to the voltage across the voice-coil motor; a second voltage representing the product of a first multiplier factor and a voltage proportional to the current in the coil; a third voltage representing the product of a prefixed bias voltage Vref and a second multiplier factor; said third voltage is calibrated by a single calibration circuitry operative to calibrate said second multiplier factor in response to a calibration control signal, in order to cancel said second voltage.

13 Claims, 4 Drawing Sheets

CALIBRATION TECHNIQUE OF A BEMF DETECTOR

This application claims the benefit of provisional application No. 60/215,808 filed Jul. 5, 2000.

The present invention relates to the positioning of the read/write transducer heads of an hard disk (HD) in a designated landing zone when requested or when the electrical power is removed from the drive. In particularly it relates to the detection of the back electromotive force (BEMF) of the motor involved in the positioning of the read/write transducer heads.

A recent parking system (Ramp Loading technology) automatically performs a park when HD driver power supply fails or when the HD controller asks for it, by means of a Voice Coil Motor (VCM).

To obtain a ramp loading system, it is mandatory to have a signal at least proportional to the speed of the motor, in order to have a good control of the positioning of the read/write transducer heads.

In fact the BEMF measurement is compared to a velocity command signal in order to sense deviation of the actual motor speed from the desired speed, and in response adjusts the drive applied to the motor to correct for the speed deviation.

Since no servo tracks are available on the ramp, VCM speed is not known. This is the reason why information about speed have to be obtained by the motor itself.

In fact back electromotive force is proportional to VCM speed through:

$$E = Ke \cdot \omega = \frac{Ke}{armlenght} \cdot speed \quad [1]$$

where Ke is the proportionality coefficient between angular speed and the back electromotive force.

Nowadays, two possible systems are known in order to obtain the speed detection.

A first way of sensing the BEMF is to use the voltage across the power bridge, that is the driver of the VCM, and the current flowing in the motor to compute the BEMF generated by the motor (continuous mode).

The second approach considers that if the Voice Coil power bridge is put in a tristate condition and the time for a complete current decay in the motor is elapsed, no current is present in the VCM and then the only voltage read across the coil is the back electromotive force (discontinuous mode).

Ramp Loading systems working in continuous mode suppose that the BEMF of the VCM is read continuously in time and it is not sampled.

In reality, the BEMF measured across a motor coil is not perfectly proportional to the motor rotational speed. Factors responsible for the imperfection are the motor resistance Rm, the sense resistor Rs and the elements (resistance and amplifiers) used in the measurement circuit.

The measured BEMF, then, can be viewed as the sum of these error components and an ideal BEMF to which the motor rotational speed is proportional.

In some applications, however, it is desirable to more accurately control motor speed. In such applications the BEMF measurement error is unacceptable. One example is the case mentioned of a voice-coil motor for a head actuator. It is important to accurately control the speed of a read/write head as it is being loaded onto a disk, so that the head does not strike the disk hard and cause damage. Similarly, it is important to avoid striking the head against a head stop when retracting the head from the disk.

Known circuits are able to accurately measure the BEMF of a VCM but require a double calibration circuit to reduce said measurement error.

In view of the state of the art described, it is an object of the present invention to provide a circuit able to accurately measure the BEMF of a VCM with a single calibration circuit.

According to the present invention, these and other objects are attained by means of a BEMF detection circuit for a voice-coil motor operative to continually generate a signal proportionally to the velocity of said voice-coil motor comprising a algebraic summing node producing at its output the BEMF of the voice-coil motor and receiving: a first voltage proportional to the voltage across the voice-coil motor; a second voltage representing the product of a first multiplier factor and a voltage proportional to the current in the coil; a third voltage representing the product of a prefixed bias voltage Vref and a second multiplier factor; said third voltage is calibrated by a single calibration circuitry operative to calibrate said second multiplier factor in response to a calibration control signal, in order to cancel said second voltage.

Such objects are also attained by a BEMF detection circuit for a voice-coil motor operative to continually generate a signal proportionally to velocity of said voice-coil motor such that said signal is the sum of a first signal component, a second signal component and a third signal component; the first signal component representing the product of a first multiplier factor and the voltage across the coil, the second signal component representing the product of a second multiplier factor and the current in the coil; the third signal component representing a signal able to eliminate said second signal component.

Thanks to the present invention, it is possible to provide a circuit able to accurately measure the BEMF of a VCM which is more precise, require less circuits and therefore less space.

The features and the advantages of the present invention will be evident from the following detailed description, illustrated as a non-limiting example in the annexed drawings, wherein.

Figure 1:
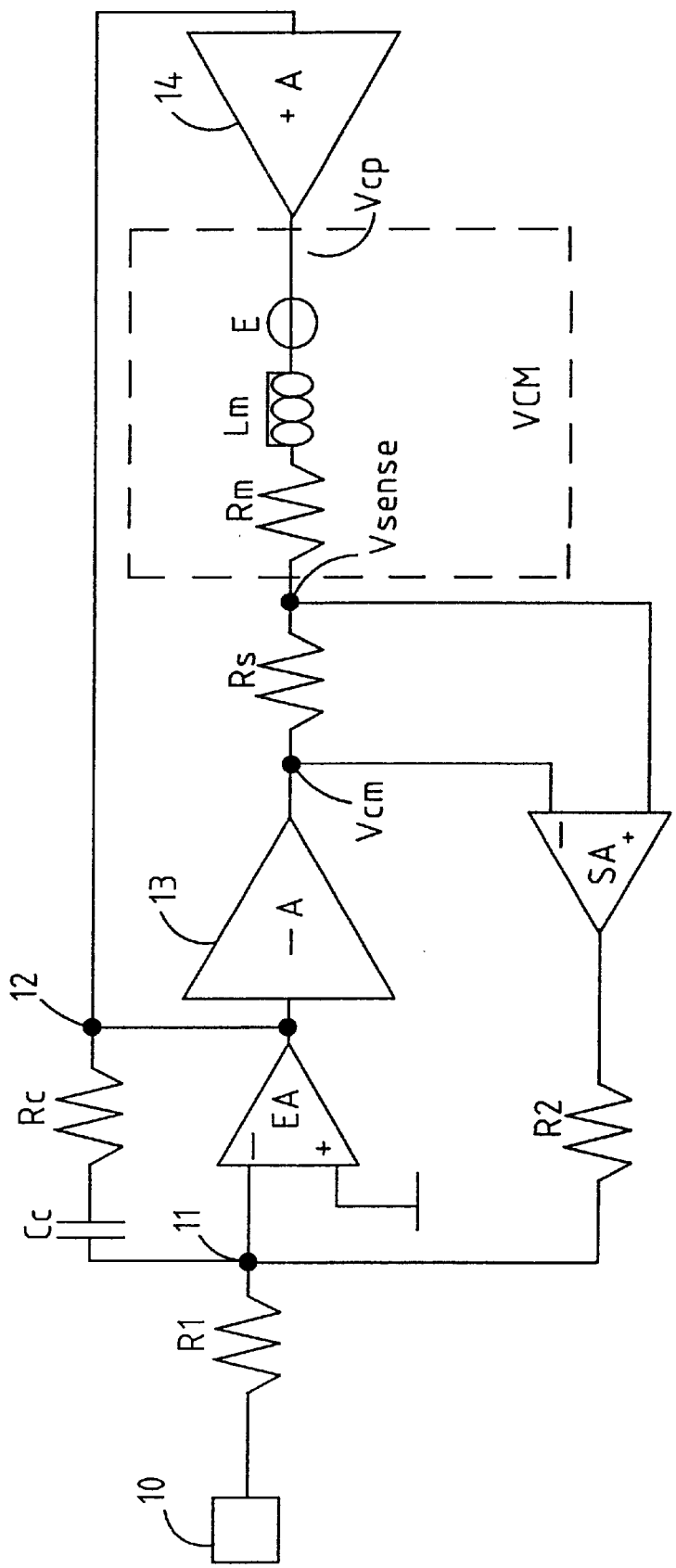
FIG. 1 shows a power bridge driver of the VCM.

Referring now to FIG. 1, a power bridge driver of the VCM is shown where a hard disk controller 10, by means of a digital to analog converter (not shown), supplies a signal to the power bridge driver for its operation. The signal is supplied to the resistance R1 which in turn is connected to a node 11. At the node 11, the inverting input of an error amplifier EA is connected, and the non inverting input is connected to a voltage reference or ground and the output is connected to a node 12. Between the node 11 and 12, connected in series are a capacitor Cc and a resistance Rc, which they with the error amplifier EA act as an integrator circuit. At the node 12, the input of the negative power driver 13 is also connected, the output of which is connected to the node Vcm. At the node 12, the input of the positive power driver 14 is connected, the output of which is connected to the node Vcp. A resistance Rs is connected between the node Vcm and a node Vsense. A VCM motor is connected between the node Vcp and the node Vsense. The VCM motor is represented in FIG. 1 by means of a resistance Rm, an inductor Lm and a voltage generator E, which corresponds to the BEMF voltage. At the node Vcm, the inverting input of a sensing amplifier SA is also connected, the non inverting input of which is connected to the node Vsense. The output of the sensing amplifier SA is connected to a resistance R2, which in turn is connected to the node 11.

The signal coming from the driver controller 10 is supplied to the error amplifier EA and it drives the power drivers 13 and 14. The sensing amplifier and the resistance R2 perform a negative feedback of the power bridge driver.

The voltage across the power bridge is given by:

$$Vcm-Vcp=(Rs+Rm)\cdot Im+Lm\cdot d/dt\cdot Im+E \quad [2]$$

Where $E=Ke*\omega$ is the VCM BEMF, Rm and Lm are the electrical parameters of the VCM, and Im is current flowing in the VCM.

In steady conditions eq. [2] becomes:

$$Vcm-Vcp=(Rs+Rm)\cdot Im+E \quad [3]$$

In order to obtain a voltage proportional to the BEMF, herewith called VTACH, we can use Vsense, Vcm and Vcp to obtain:

$$VTACH=(Vcp-Vcm)+(Vcm-Vsense)\cdot\alpha((Rs+Rm)\cdot Im+E)-Rs\cdot Im\cdot\alpha \quad [4]$$

where α is a calibration parameter.

To obtain VTACH voltage, some other solutions, which are not dealt herewith, are known. The main differences are based on how Vcm, Vcp and Vsense are combined each other. This solution has shown to be the most efficient in terms of VTACH/Offset.

Rearranging it gives:

$$VTACH=E+Im\cdot((Rs+Rm)-\alpha\cdot Rs) \quad [5]$$

and if:

$$\alpha=\frac{Rs+Rm}{Rs} \quad [6]$$

equation [4] gives VTACH=E (or BEMF) for every VCM current.

Figure 2:
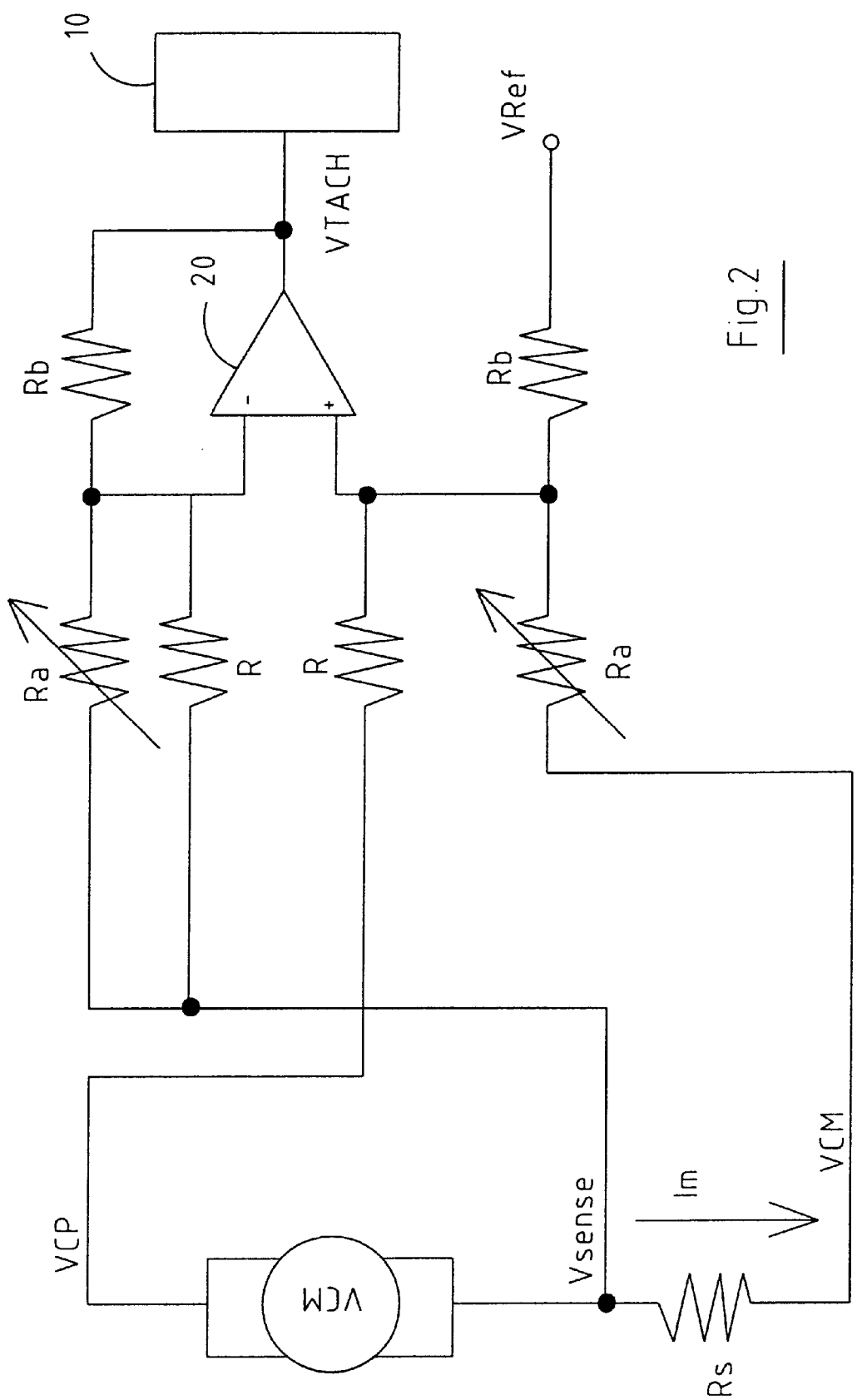
FIG. 2 shows a BEMF detection circuit according to the prior art.

Referring now to FIG. 2 where a BEMF detection circuit according to the prior art is shown, there is a VCM motor, a resistance Rs and the nodes Vcp, Vsense and Vcm as in FIG. 1, but the power bridge driver is not shown. The node Vcp is connected to a first resistance R which in turn is connected to a non inverting input of an operational amplifier 20 with the function of summing node. The node Vsense is connected to a second resistance R and to a first resistance Ra, in parallel with the second resistance R, which in turn are connected to an inverting input of the operational amplifier 20. Between the inverting input of the operational amplifier 20 and its output, a first resistance Rb is connected. The node Vcm is connected to a second resistance Ra which in turn is connected to the non inverting input of the operational amplifier 20. The non inverting input of the operational amplifier 20 is also connected to a second resistance Rb which in turn is connected to a prefixed bias voltage Vref. The output of the operational amplifier 20 produces the voltage VTACH which is supplied to the hard disk controller 10 by means of an analog to digital converter (not shown).

The two resistances Ra must be calibrated in order to get the correct BEMF. It require two circuit to performs such a calibration.

In this case the BEMF is obtained as follows:

$$VTACH=\frac{Rb}{R}\cdot BEMF+Im\cdot Rb\cdot\left(\frac{Rm}{R}-\frac{Rs}{Ra}\right)+REF \quad [7]$$

by calibrating the second term of sum:

$$Ra=\frac{Rs}{Rm}\cdot R \quad [8]$$

we obtain:

$$VTACH=\frac{Rb}{R}\cdot BEMF+REF \quad [9]$$

This solution provides a correct BEMF information, but it needs to use 2 trimming (the two Ra in FIG. 2) to compensate the Rm and Rs variation.

Figure 3:
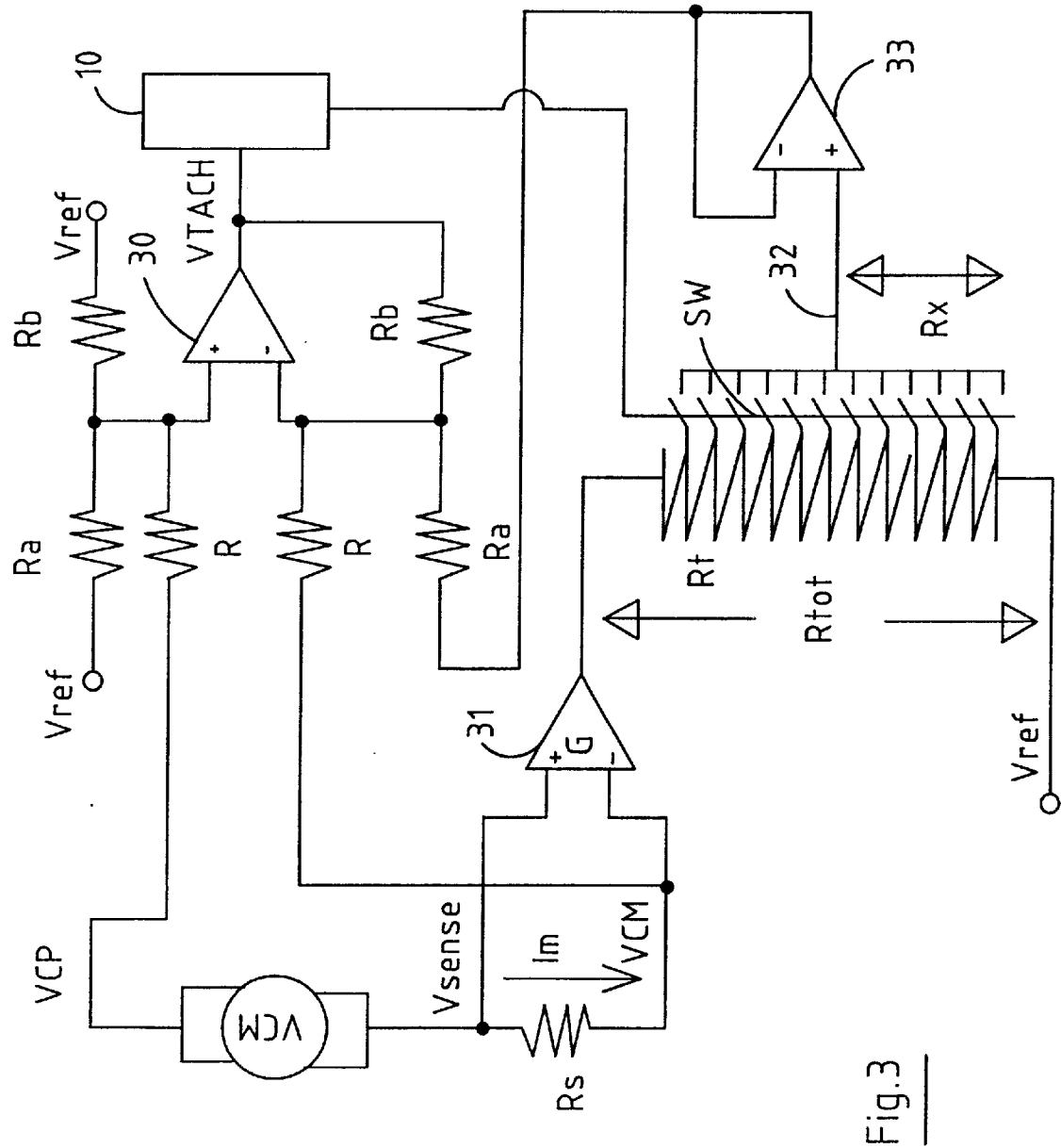
FIG. 3 shows an embodiment of a BEMF detection circuit according to the present invention.

We refer now to FIG. 3 where an embodiment of a BEMF detection circuit according to the present invention is shown. As in FIG. 2, there is a VCM motor, a resistance Rs and the nodes Vcp, Vsense and Vcm as in FIG. 1 but the power bridge driver is not shown. The node Vcp is connected to a first resistance R which in turn is connected to a non inverting input of an operational amplifier 30 with the function of a summing node. At the non inverting input of the operational amplifier 30 a first resistance Ra and first resistance Rb are also connected, which in turn are both connected to a prefixed bias voltage Vref. The node Vcm is connected to a second resistance R which in turn is connected to the inverting input of the operational amplifier 30. The node Vsense is connected to a non inverting input of an operational amplifier 31 having gain G, and the node Vcm is connected to an inverting input of the operational amplifier 31. The output of the operational amplifier 31 is connected to a terminal of a calibration element Rt that in this case corresponds to the calibration element Rtot. The other terminal of Rt is connected to a prefixed bias voltage Vref.

The calibration element Rt comprise an resistive element having a first and a second terminal including a plurality of resistances connected in series. Each terminal of the plurality of resistances is connected to a terminal of a plurality of controlled switches SW, the other terminal of each of said switches are connected together to form a node 32. In response of a digital calibration control signal coming from the hard disk controller 10 one switches SW are closed in order to take, on said node 32, a portion of the voltage applied on the calibration element Rt. The portion of the calibration element Rt from the point where a switch SW is closed to the terminal connected to Vref is called Rx. The node 32 is connected to a non inverting input of an operational amplifier 33, the inverting input is connected to its output. The output of the operational amplifier 33 is connected to a second resistance Ra which in turn is connected to the inverting input of the operational amplifier 30. Between the inverting input of the operational amplifier 20 and its output is connected to a second resistance Rb.

Figure 4:
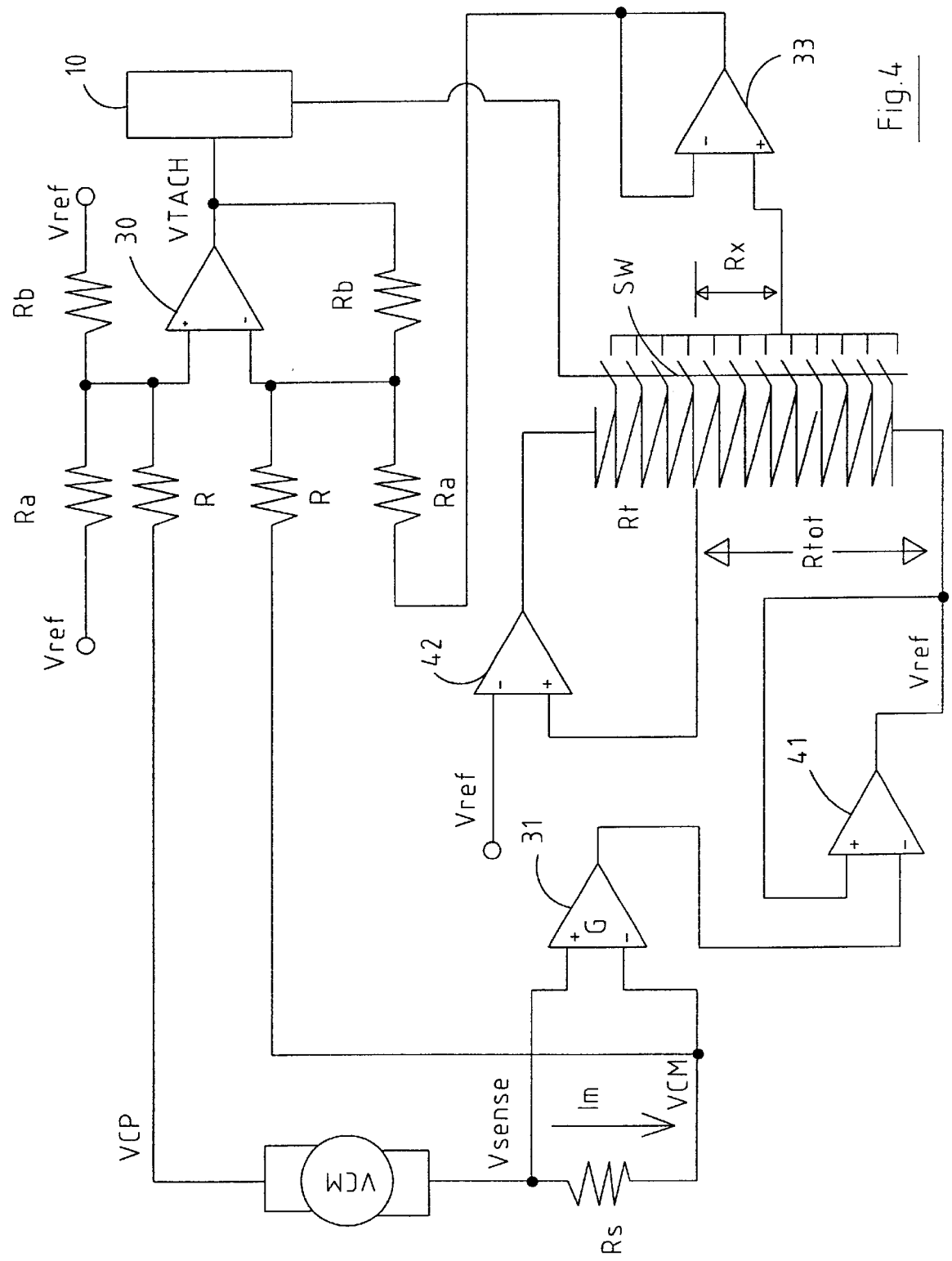
FIG. 4 shows a further embodiment of a BEMF detection circuit according to the present invention.

We refer now to FIG. 4 where is shown a further embodiment of a BEMF detection circuit according to the present invention. As in FIG. 2, there is a VCM motor, a resistance Rs and the nodes Vcp, Vsense and Vcm as in FIG. 1 but it is not shown the power bridge driver. The circuit in FIG. 4 is similar to the one of FIG. 3 except the part of circuit around the calibration element Rt. All the elements that correspond to that of FIG. 3 have the reference. The node Vsense is connected to a non inverting input of an operational amplifier 31 having gain G, the node Vcm is connected to an inverting input of the operational amplifier 31. The output of the operational amplifier 31 is connected to a non inverting input of another operational amplifier 41 which has the function of follower, in fact the inverting input of the operational amplifier 41 is connected to its output. The output of the operational amplifier 41 is connected to a terminal of the calibration element Rt. Another operational amplifier 42 has the non inverting input connected to a prefixed bias voltage Vref, the output of which is connected to the other terminal of the calibration element Rt. The inverting input of the operational amplifier 42 is connected to an intermediate point of the calibration element Rt. In this case the portion of the calibration element Rt comprised between its contact point with the inverting input of the operational amplifier 42 and the terminal of Rt connected to the output of the operational amplifier 41, correspond to the calibration element Rtot. In this case the resistance Rx is comprised between the connection point of the non inverting input of the operational amplifier 33 and the connection point of the non inverting input of the operational amplifier 42, to the resistance Rt. All the other part of the circuit are equal to that of FIG. 3.

According to the circuits of FIGS. 3 and 4 the VTACH that is equivalent at BEMF is:

$$VTACH = \frac{Rb}{R} \cdot (VCP - VCM) + \qquad [10]$$
$$G \cdot Rs \cdot \text{Im} \cdot \left(\frac{Rx}{Rtot} + REF - REF\right) \cdot \frac{Rb}{Ra} + REF$$

rearranging it gives:

$$VTACH = \left[(Rm + Rs) \cdot \frac{Rb}{R} - G \cdot Rs \cdot + \left(\frac{Rx}{Rtot} \cdot \frac{Rb}{Ra}\right)\right] \cdot \text{Im} + \qquad [11]$$
$$BEMF \cdot \frac{Rb}{R} REF$$

with calibration:

$$\frac{Rx}{Rtot} = \left(\frac{Rm + Rs}{G \cdot Rs} \cdot \frac{Ra}{R}\right) \qquad [12]$$

after the calibration, the VTACH (FIG. 4) have the following expression:

$$VTACH = BEMF \cdot \frac{Rb}{R} + REF \qquad [13]$$

According to the present invention it is sufficient only a calibration (or trimming) circuit instead of two as in the prior art: it simplify the working, the circuit and it is less expensive.

The trimming of the calibration element Rt is done by means of a word coming from a hard disk controller 10 and it can be changed, if necessary, during the working.

In the example herewith described the calibration element Rt comprises a plurality of resistances connected to a plurality of switches but it can be carry out by means of other calibration elements.

What is claimed is:

1. A BEMF detection circuit for a voice-coil motor operative to continually generate a signal proportionally to a velocity of said voice-coil motor, the BEMF detection circuit comprising:

an algebraic summing node having an output to produce a BEMF of the voice-coil motor and having:
  an input terminal coupled to receive a first voltage proportional to a voltage across the voice-coil motor;
  an input terminal coupled to receive a second voltage representing a product of a first multiplier factor and a voltage proportional to a current in a coil of the voice-coil motor; and
  an input terminal coupled to receive a third voltage representing a product of a prefixed bias voltage Vref and a second multiplier factor; and
a single calibration circuit coupled to the algebraic summing node to calibrate said third voltage and operative to calibrate said second multiplier factor in response to a calibration control signal, in order to cancel said second voltage, while the current is in the coil in a continuous mode.

2. BEMF detection circuit according to claim 1 wherein said single calibration circuitry comprises:
a resistive element having a first and a second terminal including a plurality of resistances connected in series, the first terminal is coupled to the prefixed bias voltage and the second terminal is coupled to receive a signal proportional to the current in the coil; and
said plurality of resistances are connected to a plurality of controlled switches controlled by said calibration control signal, a terminal of each of said switches are connected together to form a node, wherein on said node at least one of the switches is coupled to take a portion of a voltage applied on said plurality of resistances in response to said calibration control signal.

3. BEMF detection circuit according to claim 2, wherein said signal proportional to the current in the coil is produced by an operational amplifier that amplifies a voltage on a resistance through which the current in the coil is flowing.

4. A BEMF detection circuit for a voice-coil motor operative to continually generate a signal proportionally to a velocity of said voice-coil motor such that said signal is the sum of a first signal component, a second signal component and a third signal component, the BEMF detection circuit comprising:
a circuit block having:
  an input terminal coupled to receive the first signal component representing the product of a first multiplier factor and a voltage across the coil;
  an input terminal coupled to receive the second signal component representing the product of a second multiplier factor and a current in the coil; and
  an input terminal coupled to receive the third signal component representing a signal able to eliminate said second signal component, while the current is in the coil in a continuous mode.

5. BEMF detection circuit according to claim 4, wherein said third signal component is determined in order to have amplitude equal to said second signal component and opposite sign.

6. A BEMF detection circuit for a voice-coil motor to continually generate a signal proportional to a velocity of the voice-coil motor, the detection circuit comprising:
a summing circuit having an output terminal to output a BEMF voltage and having:
  a first input terminal to receive a first signal component that is based upon a voltage across the voice-coil motor;
  a second input terminal to receive a second signal component that is based upon a first multiplier factor and a current in a coil of the voice-coil motor; and a third input terminal to receive a third signal component that is based upon a reference voltage and a second multiplier factor; and a calibration circuit coupled to the summing circuit to calibrate the second multiplier factor of the third signal component, in response to a calibration control signal generated while the current is in the coil in a continuous mode, to cancel the second signal component.

7. The detection circuit of claim 6 wherein the summing circuit comprises an operational amplifier.

8. The detection circuit of claim 7 wherein the operational amplifier includes a non-inverting input terminal comprising the first input terminal, and an inverting input terminal comprising the second and third input terminals.

9. The detection circuit of claim 6 wherein the calibration circuit comprises:

a resistive element having a plurality of resistance elements, and having a first terminal coupled to the reference voltage and a second terminal coupled to receive a signal indicative of the current in the coil; and a plurality of controllable switches capable to be controlled by the calibration signal, and having first terminals respectively coupled to the resistance elements and second terminals coupled together at a node, wherein application of the calibration control signal at the node changes a voltage applied on the plurality of resistance elements to change the second multiplier factor.

10. The detection circuit of claim 6 wherein the calibration circuit comprises:

a resistive element having a plurality of resistance elements, and having a first terminal coupled to a voltage follower and a second terminal coupled to an output of an operational amplifier; and a plurality of controllable switches capable to be controlled by the calibration signal, and having first terminals respectively coupled to the resistance elements and second terminals coupled together at a node, wherein application of the calibration control signal at the node changes a voltage applied on the plurality of resistance elements to change the second multiplier factor.

11. The detection circuit of claim 9 wherein the calibration control signal is represented by Vref*Rx/Rtot, wherein Vref is the reference voltage, Rx is a sum of resistances corresponding to resistance elements whose controllable switches are closed, and Rtot is a total resistance of the resistive element.

12. The detection circuit of claim 9, further comprising:

an operational amplifier having an output coupled to the second terminal of the resistive element to output the signal indicative of the current in the coil; and a resistor coupled to an input terminal of the operational amplifier and through which the current in the coil flows.

13. The detection circuit of claim 9, further comprising a hard disk controller coupled to the output terminal of the summing circuit to receive the BEMF voltage and coupled to the node of the controllable switches to provide the calibration control signal to the controllable switches.

* * * * *